(12) United States Patent
Kim et al.

(10) Patent No.: US 7,962,941 B2
(45) Date of Patent: Jun. 14, 2011

(54) APPARATUS AND METHOD FOR PROVIDING CHANNEL LIST OF DIGITAL BROADCASTING IN MOBILE TERMINAL

(75) Inventors: Kang Wook Kim, Daegu Metropolitan (KR); Jong Kerl Lee, Gu mi-si (KR); Soon Jin Kim, Daegu Metropolitan (KR)

(73) Assignee: Samsung Electronics Co., Ltd (KR)

( * ) Notice: Subject to any disclaimer, the term of this patent is extended or adjusted under 35 U.S.C. 154(b) by 526 days.

(21) Appl. No.: 11/771,614

(22) Filed: Jun. 29, 2007

(65) Prior Publication Data

US 2008/0127276 A1    May 29, 2008

(30) Foreign Application Priority Data

Jul. 6, 2006    (KR) ........................ 10-2006-0063424

(51) Int. Cl.
    H04N 7/16    (2011.01)
(52) U.S. Cl. ............................................. 725/62; 725/38
(58) Field of Classification Search .................... 725/39, 725/48, 49, 38, 62
    See application file for complete search history.

(56) References Cited

U.S. PATENT DOCUMENTS

| 6,122,011 | A | * | 9/2000 | Dias et al. ...................... 348/569 |
| 6,133,910 | A | * | 10/2000 | Stinebruner .................... 725/49 |
| 6,701,526 | B1 | * | 3/2004 | Trovato ........................... 725/39 |
| 2002/0101540 | A1 | | 8/2002 | Takagi et al. |
| 2002/0124071 | A1 | | 9/2002 | Proehl et al. |
| 2004/0139480 | A1 | * | 7/2004 | Delpuch et al. ................ 725/135 |

FOREIGN PATENT DOCUMENTS

| EP | 1 646 237 | 4/2006 |
| JP | 2000-023058 | 1/2000 |
| JP | 2000-341596 | 12/2000 |
| JP | 2003-244565 | 8/2003 |
| KR | 1020060018575 | 3/2006 |
| KR | 1020060022794 | 3/2006 |
| KR | 1020060030571 | 4/2006 |
| WO | WO 2004/004322 | 1/2004 |

OTHER PUBLICATIONS

"ETSI TS 102 428 Technical Specification: Digital Audio Broadcasting (DAB); DMB video service; user Application Specification", Jun. 2005, ETSI, v1.1.1.*

Kenji Tsunashima et al: "An Integrated DTV Receiver for ATSC Digital Television Standard", vol. 44, No. 3, XP011083658, Aug. 1, 1998.

"Virtual Channel", Wikipedia, XP002564702, Mar. 13, 2006.

* cited by examiner

*Primary Examiner* — Scott Beliveau
*Assistant Examiner* — Nicholas T Corbo
(74) *Attorney, Agent, or Firm* — The Farrell Law Firm, P.C.

(57) ABSTRACT

A method and apparatus for changing a broadcasting channel list provided in a digital broadcasting service by a user are provided. The method of providing a channel list of digital broadcasting in a mobile terminal includes providing a setting screen of the channel list according to a request for setting the channel list; receiving a digital broadcasting channel selected by a user in the channel list; allocating a predetermined sky wave broadcasting channel number to a virtual channel of the selected digital broadcasting channel according to the user's request; and completing setting of a channel list including the allocated virtual channel information.

13 Claims, 7 Drawing Sheets

APPARATUS AND METHOD FOR PROVIDING CHANNEL LIST OF DIGITAL BROADCASTING IN MOBILE TERMINAL

PRIORITY

This application claims priority to an application entitled "APPARATUS AND METHOD FOR PROVIDING CHANNEL LIST OF DIGITAL BROADCASTING IN MOBILE TERMINAL" filed in the Korean Intellectual Property Office on Jul. 6, 2006 and assigned Serial No. 2006-0063424, the contents of which are incorporated herein by reference.

BACKGROUND OF THE INVENTION

1. Field of the Invention

The present invention relates to a mobile terminal, and, more particularly, to a method and apparatus for changing a channel list of digital broadcasting in a mobile terminal having a digital broadcasting function.

2. Description of the Related Art

In general, a mobile communication system provides various services such as a voice communication service, Short Message Service (SMS), Multimedia Messaging Service (MMS), data communication service, and camera function. Nowadays, a mobile terminal provides a Digital Multimedia Broadcasting (hereinafter, 'DMB') service.

Digital broadcasting is a broadcasting service for providing a high image quality and a high sound quality to a user by replacing conventional analog broadcasting.

Interest in a digital broadcasting service for enabling digital broadcasting to view/listen while moving according to development of a digital broadcasting technology and a mobile communication technology has increased. Particularly, interest in a DMB service using a mobile terminal has increased.

The DMB service is generally a broadcasting service for modulating various analog multimedia signals, such as an audio signal or a video signal, into a digital multimedia signal and the DMB service provides the modulated multimedia signal to a fixed or mobile terminal.

The DMB service is based on Digital Audio Broadcasting (DAB) that is a digital radio technology, adds multimedia broadcasting thereto, and includes a service that can additionally send data such as moving pictures, weather, news and position information. The DMB service can provide a high sound quality and high image quality broadcasting of a Compact Disk (CD) or Digital Versatile Disk (DVD) level to a mobile terminal or a terminal for vehicles even while moving and thus has been the focus for next generation broadcasting.

That is, the DMB service is a broadcasting service for enabling a user to view/listen to various multimedia broadcasting, even while moving, utilizing a mobile terminal or a terminal for vehicles having a non-directional receiving antenna.

The DMB service is a broadcasting service different from existing broadcasting in view of mobility and is divided into satellite DMB and terrestrial DMB according to a broadcasting type. The compared result of the existing broadcasting service and the DMB service is shown in Table 1.

TABLE 1

| | Mobility | | |
|---|---|---|---|
| | Fixed type | Mobile type | Comparison |
| Transmission type | Existing sky wave broadcasting | Terrestrial DMB | Transmitting broadcasting in a ground transmitting station |
| | Existing satellite broadcasting | Satellite DMB | Transmitting broadcasting using satellite |
| Comparison | Reception device (medium and large size) | Reception device (ultra small size) | |

As shown in Table 1, the DMB service provides mobility in a small receiving device, compared with the existing broadcasting service. Further, the DMB service is divided into terrestrial DMB and satellite DMB according to whether a broadcasting service is provided in a ground transmitting station or using an artificial satellite.

As shown in Table 1, when the satellite DMB sends a program from a satellite DMB broadcasting center using a satellite, the satellite transmits the program to mobile terminals having a DMB function scattered in a wide area through electric waves. As described above, the satellite DMB service is a new media broadcasting service for sending broadcasting electric waves through an artificial satellite and receiving the sent broadcasting electric waves in the mobile terminal. Because the satellite DMB service uses a satellite, broadcasting electric waves can be received anywhere outdoors. However, indoors or in other weak electric wave areas, broadcasting electric waves are received using a transponder called a gap filler, and the gap filler resends the electric waves to the mobile terminal.

As shown in Table 1, the terrestrial DMB sends a program through a Base Station (BS), unlike the satellite DMB. As described above, the terrestrial DMB service is a mobile multimedia service that provides TV broadcasting, audio broadcasting, and data broadcasting using ground waves. The terrestrial DMB uses a broadcasting transmitting system such as a base station of a mobile terminal, unlike the satellite DMB.

A configuration of a system for providing a general DMB service is described as follows with respect to FIG. 1.

Figure 1:
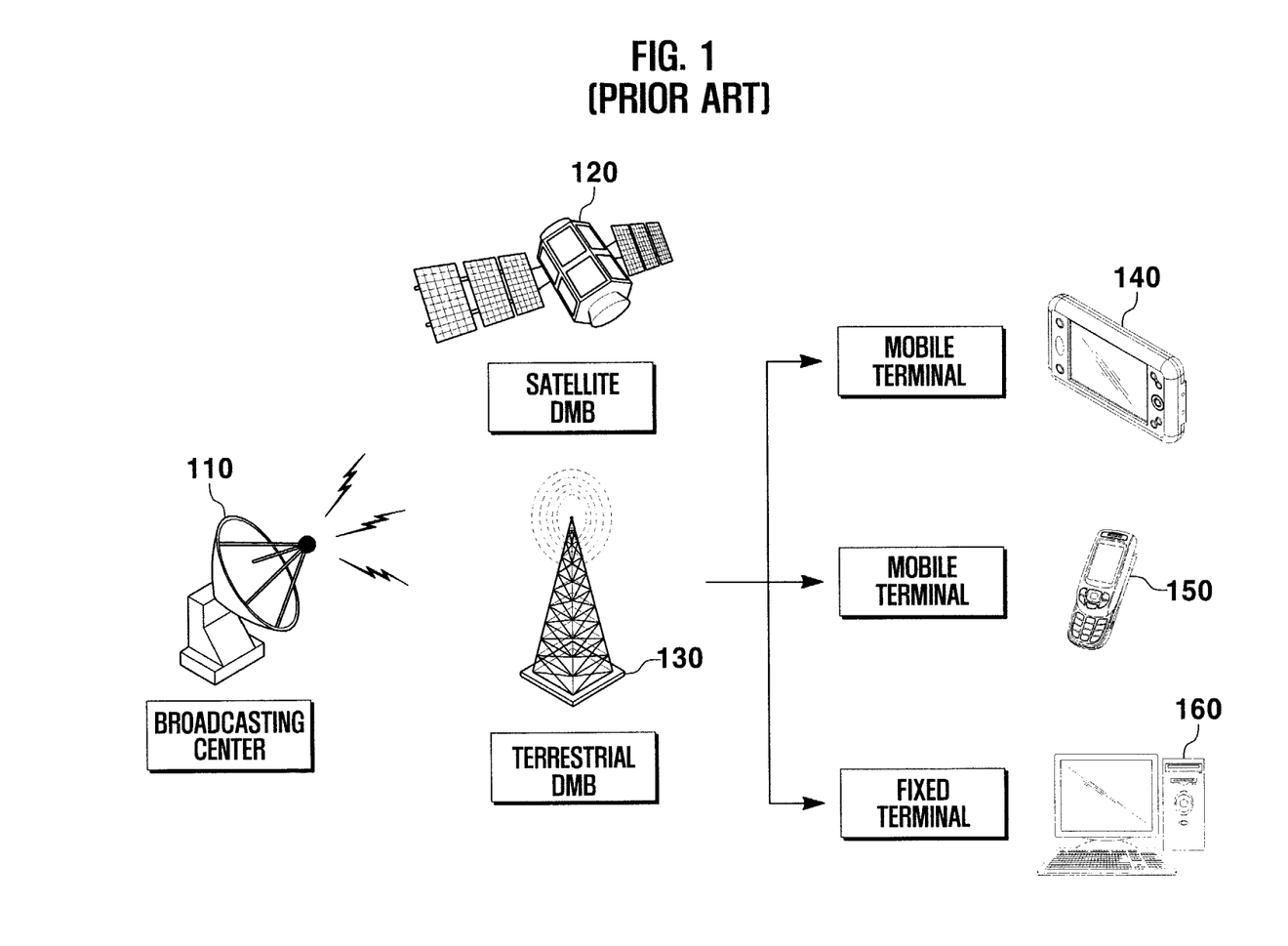
FIG. 1 is a block diagram illustrating a configuration of a system for embodying a general digital broadcasting service.

Referring to FIG. 1, the system for providing a digital broadcasting service includes a broadcasting center 110, at least one satellite 120, at least one base station 130, a receiver 140 for vehicles, receiver 150 for a mobile terminal, and receiver 160 for a home.

The broadcasting center 110 compresses and modulates DMB data, for example, an audio, video, or character signal, and sends the signal to the satellite 120 or the base station 130.

The satellite 120 or the base station 130 receives and amplifies the signal sent from the broadcasting center 110, converts a frequency thereof, and broadcasts the signal to the receiving device 140, 150 or 160.

The receiving device 140, 150 or 160 receives, demodulates, and decompresses the signal broadcasted from the satellite 120 or the base station 130, converts the signal to an original signal, and outputs the signal.

Due to fast development of a DMB service technology, a user can view clear digital broadcasting without noise, even while moving in a high speed. Accordingly, the development of DMB service makes necessary additional functions and service for providing convenience to the user has been increased.

SUMMARY OF THE INVENTION

The present invention solves the above problems, and an object of the present invention is to provide a method and apparatus for changing a channel list of digital broadcasting received from a broadcasting center according to user convenience in a mobile terminal having a digital broadcasting function.

Another object of the present invention is to provide a method and apparatus for virtually mapping a broadcasting channel provided in digital broadcasting service to a channel number of sky wave broadcasting or cable broadcasting and constructing the mapped channel to a user's broadcasting channel list.

Another object of the present invention is to provide a method and apparatus for more conveniently converting to an actual DMB channel corresponding to the virtual channel by mapping a DMB channel to a sky wave broadcasting or cable broadcasting channel, allocating a virtual channel to the mapped channel, and inputting the corresponding channel number to the virtual channel.

In accordance with an aspect of the present invention, the above and other objects are accomplished by a method of providing a channel list of digital broadcasting in a mobile terminal, the method including providing a setting screen of the channel list according to a request for setting the channel list; receiving a digital broadcasting channel selected by a user in the channel list; allocating a predetermined sky wave broadcasting channel number to a virtual channel of the selected digital broadcasting channel according to the user's request; and completing setting of a channel list including the allocated virtual channel information.

In accordance with another aspect of the present invention, the above and other objects are accomplished by a method of providing a channel list of digital broadcasting in a mobile terminal, the method including receiving and reproducing digital broadcasting according to a user's request; determining whether an event for capturing a screen is generated while reproducing the digital broadcasting; capturing and storing, if the event for capturing a screen is generated, a screen of the reproducing digital broadcasting; extracting a specific logo and/or character included in the screen of the captured and stored digital broadcasting; searching for sky wave broadcasting channel information corresponding to the extracted logo and/or character; allocating a virtual channel to the reproducing digital broadcasting using the found sky wave broadcasting channel information corresponding to the logo and/or character; and completing setting of a channel list including information about the allocated virtual channel.

In accordance with another aspect of the present invention, the above and other objects are accomplished by a method of converting a channel of digital broadcasting in a mobile terminal, the method including receiving and reproducing digital broadcasting according to a user's request; determining, if a predetermined key is input while reproducing the digital broadcasting, a signal of the input key; extracting, if a signal of the input key is the input of a channel number for converting a channel of the digital broadcasting, digital broadcasting channel information corresponding to the channel number; converting from a channel of the reproducing digital broadcasting to the extracted digital broadcasting channel based on the extracted digital broadcasting channel information; and receiving and reproducing digital broadcasting of the channel converted by conversion of the digital broadcasting channel.

In accordance with another aspect of the present invention, the above and other objects are accomplished by a mobile terminal for providing a digital broadcasting service, the method including a multimedia module for receiving and providing digital broadcasting and a channel list provided in a digital broadcasting service; a key input unit for inputting information for mapping DMB channels in a channel list of the received digital broadcasting to virtual channels according to user setting and key information for converting a channel of digital broadcasting; a memory unit for storing programs for providing the digital broadcasting service and programs for providing a channel list to which the sky wave broadcasting channel number are virtually mapped, and for storing data generated while performing the programs, sky wave broadcasting channel information, and the channel list; and a controller for controlling to extract a logo or character corresponding to a sky wave broadcasting channel from a screen of reproducing digital broadcasting and to allocate a virtual channel to a channel of the reproducing digital broadcasting using the extracted logo or character.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE PREFERRED EMBODIMENTS

Exemplary embodiments of the present invention are described with reference to the accompanying drawings, in which the same reference numbers are used to refer to the same or like parts. Detailed descriptions of well-known functions and structures incorporated herein may be omitted to avoid obscuring the subject matter of the present invention.

While the present invention is described in embodiments of many different forms, specific embodiments of the present invention are shown in drawings and are described herein in detail, with the understanding that the present disclosure is to be considered as an exemplification of the principles of the invention and is not intended to limit the invention to the specific embodiments illustrated.

In an exemplary embodiment of the present invention, a virtual channel list is constructed by changing a DMB broadcasting channel to a sky wave broadcasting or cable broadcasting channel list familiar with a user when changing the DMB broadcasting channel list.

In general, an advantage of the DMB service is to provide many more channels than in existing analog type broadcasting.

For example, the existing analog type broadcasting has about 4 or 5 sky wave broadcasting or cable broadcasting channels, with about a few dozen channels if cable broadcasting uses a satellite.

The number of channels is limited since analog broadcasting uses a different frequency for each channel, and usable frequencies in analog broadcasting are limited.

Because it is unnecessary to use a different frequency in each channel, unlike existing analog broadcasting, the DMB service can provide many more channels than the existing analog broadcasting. Accordingly, the number of channels by which a user can view in the DMB service can be greatly increased later.

However, assuming that the quantity of DMB channels by which the user can view is in the hundreds, for example about 200 or 300, when the user searches for a desired channel with a general method of displaying a broadcasting channel list, the user would have to check 200 or 300 broadcasting channels, one by one.

Further, when a mobile terminal for using the DMB service generally displays a channel list, the quantity of channel lists that can be displayed on a screen is limited to about six channels.

Further, even for a channel list of sky wave broadcasting or cable broadcasting that the user is familiar with, it is inconvenient for the user to use a broadcasting service. In addition, because channel information of sky wave broadcasting or cable broadcasting provided in the DMB service is different from that in general analog broadcasting, it is inconvenient for the user to use a sky wave broadcasting or cable broadcasting service provided in the DMB service.

Accordingly, in exemplary embodiments of the present invention, a broadcasting channel list provided in the DMB service can be changed to provide user convenience. Changing broadcasting channels provided in the DMB service to sky wave broadcasting or cable broadcasting channels familiar to the user and constructing a broadcasting channel list by virtual channels, increases user convenience.

Further, when a broadcasting channel list is constructed with the virtual channel, information about general sky wave broadcasting or cable broadcasting channel, for example a logo or character column of networks, e.g. MBC/KBS/SBS/YTN/NBC/CNN/NHK/BBC displayed while providing the DMB service is recognized and extracted, and a viewing channel is virtually automatically mapped to an actual sky wave broadcasting or cable broadcasting channel number. Further, the mapped channel number can be easily moved using a hotkey of a key input unit.

For convenience of description, as a mobile terminal for providing a DMB service for performing functions according to exemplary embodiments of the present invention, a mobile communication terminal is exemplified, though the present invention is not limited thereto.

That is, the mobile terminal according to exemplary embodiments of the present invention includes information communication appliances and multimedia appliances such as a mobile terminal, mobile phone, DMB receiver, wired/wireless phone, Personal Digital Assistant (PDA), smart phone, International Mobile Telecommunication 2000 (IMT-2000) terminal, Universal Mobile Telecommunication Service (UMTS) terminal, and DMB terminal, for providing a DMB service, and applications thereof.

Figure 2:
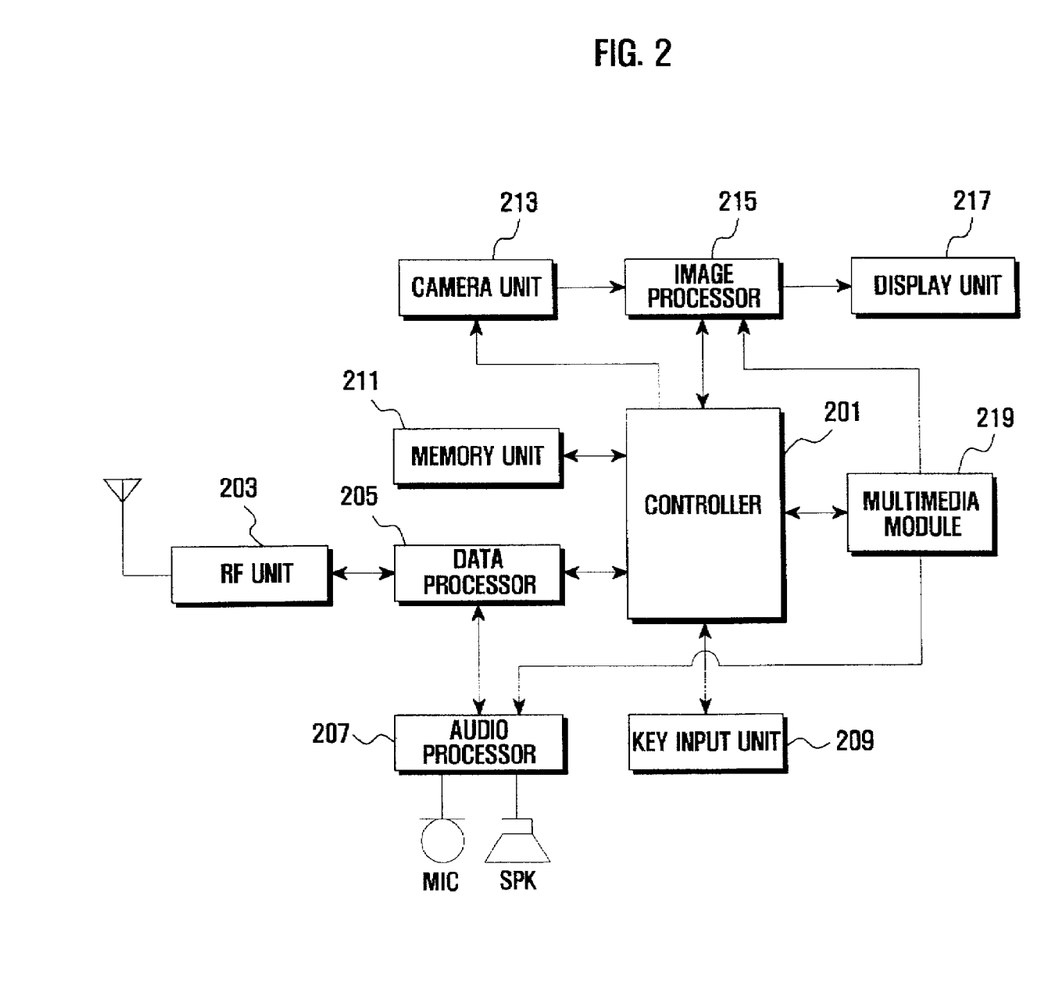
FIG. 2 is a block diagram illustrating a configuration of a mobile terminal according to an exemplary embodiment of the present invention.

FIG. 2 is a block diagram illustrating a configuration of a mobile terminal according to an exemplary embodiment of the present invention.

The mobile terminal receives a DMB broadcasting channel list transmitted from a predetermined broadcasting center, reconstructs the received DMB broadcasting channel list by a user's request, and the DMB channel list is reconstructed by virtually mapping the DMB channel list according to sky wave broadcasting or cable broadcasting channel information.

Particularly, in exemplary embodiments of the present invention, a logo or character column of a broadcasting channel displayed while reproducing broadcasting with the DMB service is recognized, the DMB broadcasting channel is virtually automatically mapped to channel information of sky wave broadcasting or cable broadcasting familiar with a user, and the order of the channel list is changed to be identical to the channel order of the sky wave broadcasting or cable broadcasting. Further, the virtually mapped channel number can be moved using a hotkey provided in the keypad of the mobile terminal.

The mobile terminal includes a controller 201, Radio Frequency (RF) unit 203, data processor 205, audio processor 207, key input unit 209, memory unit 211, camera unit 213, image processor 215, display unit 217, and multimedia module 219.

Referring to FIG. 2, the mobile terminal for providing the DMB service is largely divided into an input means, a processing means, a storage means, an output means and a communication means.

The input means functions to allow input of multimedia data such as voice data, numeral/character data, and image data, and includes the audio processor 207, key input unit 209, and camera unit 213. Further, when a liquid crystal display (LCD) of the display unit 217 is a touch screen, the display unit 217 is included in the input means.

The processing means processes user data input via the input means, for example, voice data, numeral/character data, and image data, and an additional function requested by the user, for example, a DMB function. The processing means includes the controller 201, data processor 205, image processor 215, and multimedia module 219.

The storage means stores user data input through the input means, data related a DMB service transferred through the multimedia module 219, and stores applications for additional functions of the mobile terminal, for example, an audio/video broadcasting service according to the DMB service and an application for changing a broadcasting channel list provided in the DMB service according to a user's request, and includes the memory unit 211.

The output outputs user data input through the input means or the user data stored in the storage means, and a screen according to an additional function, and includes the audio processor 207 and the display unit 217.

The communication means performs a wireless transmitting function of user data to another user terminal or a transmitting and receiving function of contents through connection to a web server, and includes the RF processor 203 and at least one antenna.

In more detail, the RF processor 203 performs a series of communication such as mobile phone communication, Short Message Service (SMS) communication, Multimedia Message Service (MMS) communication, and data communication. Further, the RF processor 203 converts voice/sound data and control data to a wireless signal and sends the signal, and receives the wireless signal and converts the signal to the voice/sound data and the control data and outputs the signal. The RF processor 203 preferably includes an RF transmitter for up-converting a frequency of a signal to be transmitted and amplifying the signal, and an RF receiver for low-noise amplifying a received signal and down-converting a frequency thereof.

The data processor 205 processes voice data transferred from the audio processor 207 or numeral/character data that are input by the user through the key input unit 209. Further, the data processor 205 includes means for encoding and modulating a signal transmitted through the RF processor 203 and means for demodulating and decoding a signal received through the RF processor 203.

That is, the data processor 205 includes a transmitter for encoding and modulating a signal to be transmitted and a receiver for demodulating and decoding the received signal. Accordingly, the data processor 205 includes a modem and a codec. The codec includes a data codec for processing packet data, and an audio codec for processing an audio signal such as a voice.

The audio processor 207 reproduces an audio signal that is output from the data processor 205 or the multimedia module 219 through a speaker SPK, and transmitting an audio signal such as a voice that is input from a microphone MIC to the data processor 205. That is, the audio processor 207 converts and outputs voice/sound data to an audible sound through the speaker SPK by the control of the controller 201, and converts an audio signal such as a voice received from the microphone MIC to data and outputs the data.

The key input unit 209 includes a plurality of numerals and characters, and/or function keys for inputting numeral and character information and for setting various functions. Further, the key input unit 209 receives information for mapping a received broadcasting channel list to a virtual channel to correspond to a user's setting and setting information related to the function control, and outputs a key input signal to the controller 201.

Further, the function key may include a soft key and a hotkey for mapping a broadcasting channel to a virtual channel and for constructing the virtual channel to a channel list, and keys mapped to perform a function corresponding to the keys.

For example, the key input unit 209 performs key input for generating DMB channels in a broadcasting channel list received by the multimedia module 219 to virtual channels based on sky wave broadcasting or cable broadcasting channel information, and performs key input for changing the received broadcasting channel list and the generated virtual channels to a user's channel list.

Further, the key input unit 209 receives information for changing a broadcasting channel by the user while providing a DMB service and outputs a key input signal to the controller 201. For example, as described above, in a state where virtual channels are allocated to DMB channels, when a channel number of a predetermined sky wave broadcast or cable broadcast mapped to the virtual channel is input by the user while providing the DMB service, a key input signal for converting the channel to the DMB channel corresponding to the sky wave broadcasting or cable broadcasting is output to the controller 201.

The memory unit 211 includes a program memory and a data memory. In the program memory, programs for controlling the general operation of the mobile terminal, programs for providing a DMB service, and programs for mapping broadcasting channels in a broadcasting channel list of the DMB service to virtual channels are stored and a channel list is reconstructed including the virtual channels.

In the data memory, data generated while performing the programs, setting information related to the DMB service, setting information related to a function of generating virtual channels based on sky wave broadcasting or cable broadcasting channel information and reconstructing a channel list including the virtual channels, and user data corresponding to the setting information are stored, and a database for storing each data is included.

Further, programs for mapping broadcasting channels in a broadcasting channel list according to the DMB service to virtual channels and reconstructing a channel list including the virtual channels includes a program for providing audio/video information and channel information provided by the DMB service according to input information for using the DMB service; a program for providing, when the broadcasting channel list is requested, the broadcasting channel list of a received DMB service in response to the request; a program for converting to a channel list setting mode according to a channel list setting request after the broadcasting channel list is provided; a program for mapping a broadcasting channel selected by the user after being converted to the channel list setting mode to the virtual channel according to a request of the user; a program for recognizing and extracting a character or logo corresponding to sky wave broadcasting or cable broadcasting channel information while providing the DMB service; a program for virtually automatically mapping a reproducing DMB channel to a channel number according to the extracted sky wave broadcasting or cable broadcasting channel information; a program for moving, when a channel number according to sky wave broadcast or cable broadcast channel information is input to the virtual channel while providing the DMB service, a channel to a DMB channel mapped to correspond to a virtual channel number; a program for reconstructing a channel list including broadcasting channels mapped to the virtual channels according to a setting type or a user's request; and a program for performing the setting and control related to a function of mapping broadcasting channels of the DMB service to the virtual channels based on sky wave broadcasting or cable broadcasting channel information and converting a channel list to the user's request order.

Preferably, an exclusive application including modules of the described programs is stored in a flash file.

The camera unit 213 photographs an object, receives a data signal, converts the received data signal to an image/video signal, and outputs the signal by the control of the controller 201. The camera unit 213 includes a camera sensor for converting the photographed photo signal to an electrical signal and a signal processor for converting an analog signal photographed from the camera sensor to a digital signal.

The camera sensor includes a Complementary Metal Oxide Semiconductor (CMOS) or a Charge Coupled Device (CCD) sensor, and the signal processor includes a Digital Signal Processor (DSP). Further, the camera sensor and the signal processor can be embodied either with an integral type or a separate type, and the camera unit 213 may be omitted.

The image processor 215 generates screen data for displaying an image signal that is output from the camera unit 213. Further, the image processor 215 generates screen data for displaying a DMB signal received in the multimedia module 219 by the control of the controller 201. Further, the image processor 215 transmits screen data related to a function of reconstructing the broadcasting channel list to correspond to a size of the display unit 219 by the control of the controller 201.

For example, the image processor 215 processes an image signal that is output from the camera unit 215 in a frame unit, and outputs frame image data to correspond to a feature and a size of the display unit 217. Further, the image processor 215 outputs a DMB signal and a broadcasting channel list according to the DMB signal received in the multimedia module 219 to correspond to a feature and a size of the display unit 219.

The image processor 215 further outputs the reconstructed channel list by mapping broadcasting channels of the broadcasting channel list to virtual channels according to sky wave broadcasting or cable broadcasting channel information to correspond to a feature and a size of the display unit 319.

Further, the image processor 215 includes an image codec, and performs a function of compressing frame image data displayed in the display unit 217 in a selected method or restoring the compressed frame image data to original frame image data. The image codec includes a Joint Photographic Experts Group (JPEG) codes, Moving Picture Experts Group-4 (MPEG4) codec, and Wavelet codec.

The display unit 217 displays a screen for executing image data that are output from the image processor 215, user data requested by the user, and an additional function. The display unit 217 may include a Liquid Crystal Display (LCD) screen.

Further, the display unit 217 displays execution screen data corresponding to applications for providing a DMB service and video data of an audio/video channel, audio data, caption data, and a function selection menu related to the data in the DMB service on a screen. The display unit 217 further displays a channel list received by the multimedia module 219 on a screen in a screen constructing method corresponding to user setting.

Further, the display unit 217 displays a virtual channel changed to correspond to user setting using the received channel list and a reconstructed channel list including the virtual channel on the screen.

The virtual channel is generated to correspond to a sky wave broadcasting or cable broadcasting channel information. Further, the virtual channel can be generated by recognizing sky wave broadcasting or cable broadcasting channel information, for example, a logo or character column while providing the DMB service, and virtually mapping a reproducing DMB channel to a sky wave broadcasting or cable broadcasting channel number.

The multimedia module 219 recognizes a DMB service type requested by a user, for example, a satellite DMB or terrestrial DMB, and provides a broadcasting service such as a video, audio, and character corresponding to the recognized service type. The multimedia module 219 further either separately or simultaneously provides user data or application related to the broadcasting service through the image processor 215 or the audio processor 207.

Specifically, the multimedia module 219 receives a DMB signal transmitted from a predetermined broadcasting center. The multimedia module 219 has a function as a satellite DMB broadcasting reception module when the received DMB signal is transmitted through the satellite DMB, and has a function as a terrestrial DMB broadcasting reception module when the received DMB signal is transmitted through the terrestrial DMB. That is, the multimedia module 219 is a broadcasting reception module for receiving a DMB signal regardless of a satellite or terrestrial DMB signal.

Although not shown in FIG. 2, the multimedia module 219 may preferably include an interface unit for connecting to the mobile terminal, the previously described input means, processing means, storage means, and output means.

In FIG. 2, the multimedia module 219 further performs only a function as a DMB receiving device, but is not so limited. That is, the multimedia module 219 may have a function of recognizing a logo or character column of a broadcasting company displayed when a DMB service is provided, virtually mapping DMB channels to sky wave broadcasting or cable broadcasting channels, and changing a channel list. For this, the multimedia module 219 may include a user channel setting unit for setting a channel list including virtual channels.

The controller 201 controls the general operation of the mobile terminal. The controller 201 may further include the data processor 205. The controller 201 controls signal flow between the data processor 205, key input unit 209, memory unit 211, camera unit 213, image processor 215, and multimedia module 219.

Particularly, the controller 201 controls recognition and extraction of a logo or character column of a broadcasting company corresponding to a reproducing channel in a DMB signal received through the multimedia module 219 and to virtually automatically map the reproducing channel to a sky wave broadcasting or cable broadcasting channel of the broadcasting company corresponding to the logo or character column using the extracted logo or character column.

Further, if a change signal for using a DMB service is input from the key input unit 209, the controller 201 controls mode setting corresponding to the signal. For example, the controller 201 controls conversion and setting from a phone mode for a mobile communication service to a multimedia mode for a DMB service. Further, the controller 201 controls display of user data or an additional function generated or managed to correspond to the input conversion or setting signal.

Further, when a channel change signal is input through the key input unit 209 while reproducing the DMB signal received through the multimedia module 219, the controller 201 controls conversion of a channel to a DMB channel mapped to the input channel change signal and display of the DMB channel. The channel change signal includes a sky wave broadcasting or cable broadcasting channel number.

Further, the controller 201 performs a series of control functions according of exemplary embodiments of the present invention. For example, the controller 201 controls functions of screen capturing, storing, and character or logo extraction of a DMB signal provided through the multimedia module 219 according to a user's request or a predetermined method, comparison the extracted character or logo with existing sky wave broadcasting or cable broadcasting channel information, and virtual channel allocation.

Specifically, the controller 201 controls capture of a screen including a character or logo according to a user's request or a setting method while providing the DMB signal received by the multimedia module 219. Further, the controller 201 controls extraction of a predetermined character or logo from the captured screen data, and search for or extract sky wave broadcasting or cable broadcasting channel information corresponding to the extracted character or logo in the memory unit 211. The controller 201 further controls allocation of a reproducing DMB channel to a virtual channel using the found and extracted information.

For example, if a channel number of the reproducing DMB channel is channel '5' corresponding, for example to, an 'MBC' broadcasting company, the controller 201 recognizes the character or logo of 'MBC' and allocates channel '11', which is a sky wave broadcasting or cable broadcasting channel number to a virtual channel of the DMB channel.

Figure 3:
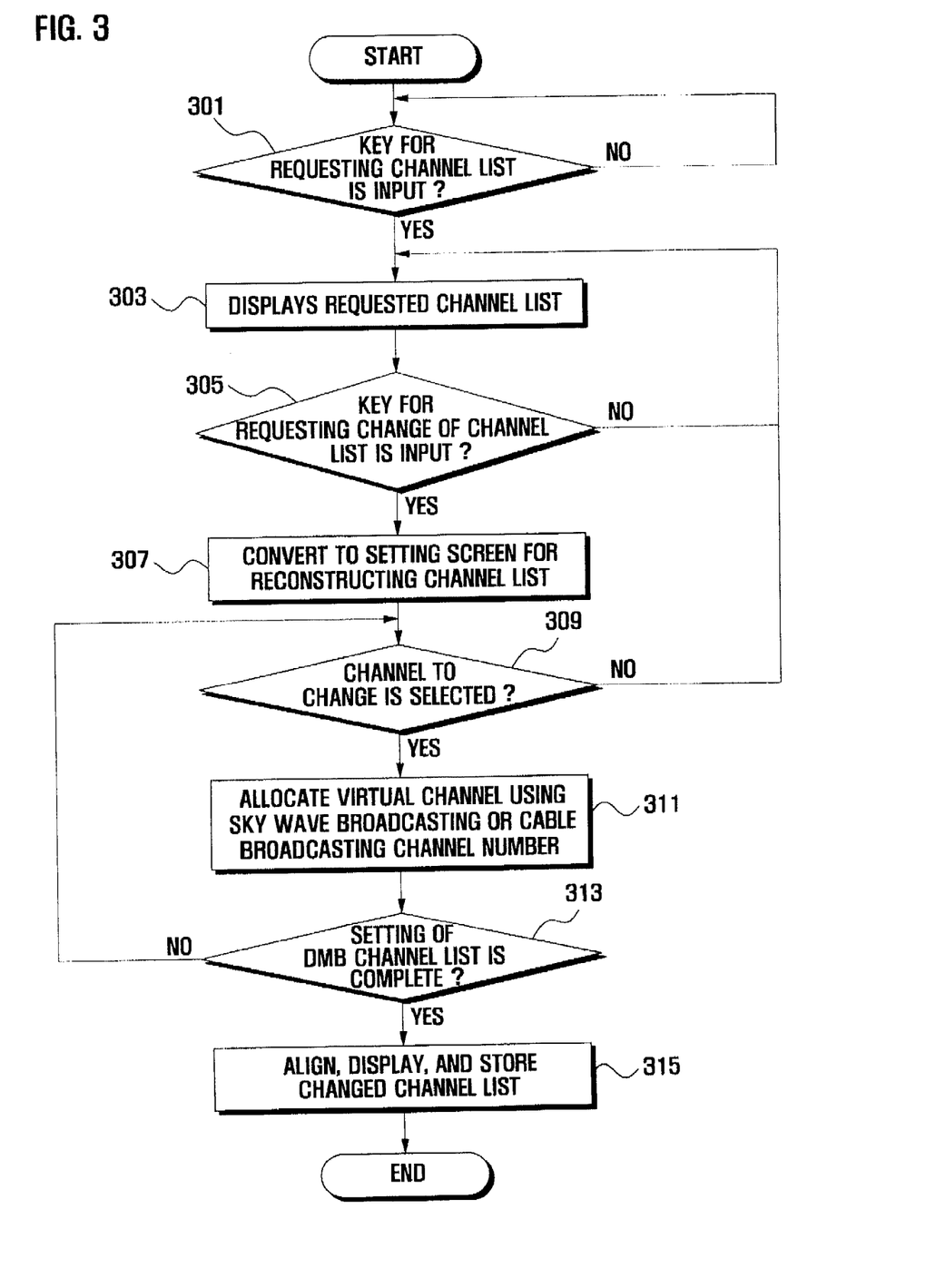
FIG. 3 is a flowchart illustrating a method of providing a channel list in a mobile terminal according to an exemplary embodiment of the present invention.

Thereafter, if a predetermined virtual channel number allocated to the virtual channel is input by a user while providing the DMB signal, the controller 201 controls conversion of the channel to a channel of the DMB signal mapped to the virtual channel number and display the channel. Hereinafter, a method of automatically mapping a virtual channel and setting a channel list by recognizing a character/logo of a broadcasting station according to exemplary embodiments of the present invention are described in detail with reference to. FIG. 3, which is a flowchart illustrating a method of providing a channel list in a mobile terminal according to an exemplary embodiment of the present invention.

Referring to FIG. 3, the mobile terminal determines whether a key for requesting a channel list is input by a user in Step 301. If a key for requesting a channel list is input by a user, the mobile terminal displays a requested channel list on a screen in Step 303.

Thereafter, the mobile terminal determines whether a key for requesting the change of the channel list is input by the user in Step 305. If a key for requesting the change of the channel list is input by the user, the process continues at Step 307.

A display screen of the channel list is converted to a setting screen for reconstructing the channel list according to a request for changing the channel list in Step 307.

Conversion of the setting screen is conversion to a mode that can edit the channel list displayed on the display screen of the channel list. Accordingly, if a predetermined channel is selected after the screen is converted, it is preferable that an edit window for editing the corresponding channel information is displayed in an overlay form on a screen, rather than conversion to the selected DMB channel.

Next, after being converted to the change list setting screen, the mobile terminal determines whether a channel to change to is selected by the user in Step 309. If a channel change selected by the user, a process continues at Step 311.

The mobile terminal allocates a virtual channel using a sky wave broadcasting or cable broadcasting channel number to the DMB channel selected by the user in Step 311 and a process continues at Step 313.

For example, the mobile terminal determines the selected DMB channel information, extracts sky wave broadcasting or cable broadcasting channel information corresponding to the selected DMB channel information from the storage unit, acquires a sky wave broadcasting or cable broadcasting channel number from the extracted sky wave broadcasting or cable broadcasting channel information, and allocates a virtual channel to the DMB channel.

Further, the mobile terminal displays the selected DMB channel information in an overlay form on the edit window, maps a virtual channel number that is input on the edit window by the user to the selected DMB channel, and allocates the virtual channel to the selected DMB channel.

Next, the mobile terminal determines whether setting of the DMB channel list is complete by allocating the virtual channel in Step 313. If setting of the DMB channel list is not complete, the process is repeated by returning to Step 309.

If setting of the channel list is complete, the mobile terminal aligns, displays, and stores a channel list changed by allocating the virtual channel in a channel list order of sky wave broadcast or cable broadcast in Step 315.

Hereinafter, examples of allocating virtual channels using sky wave broadcast or cable broadcast of channel information to predetermined channels of a DMB channel list basically supplied in the DMB service, for example, channel information of MBC, SBS, and KBS, and reconstructing a channel list including the virtual channels are shown in Tables 2 to 4.

TABLE 2

| Ensemble Label | Service Label | Using Frequency | Provider |
|---|---|---|---|
| 1. U1 DMB | U1 | 8A | U1 Media |
| 2. U1 DMB | KBS HEART | 8A | U1 Media |
| 3. YTN DMB | mYTN | 8B | YTN |
| 4. 1to1 | 1to1-TV | 8C | Korea DMB |
| 5. MBC DMB | myMBC | 12A | MBC |
| 6. U-KBS | KBS-STAR | 12B | KBS |
| 7. SBS DMB | SBS u TV | 12C | SBS |
| . | . | . | . |
| . | . | . | . |
| . | . | . | . |

TABLE 3

| Channel | Channel Name | Channel Content | Genre |
|---|---|---|---|
| CH 2 | EBS Plus1 | EBS Plus1 | Education/Others |
| CH 3 | EBS Plus2 | EBS Plus2 | Education/Others |
| CH 5 | EBS | EBS | Education/Others |
| CH 6 | Broadcasting University TV | Broadcasting University TV | Education/Others |
| CH 7 | KBS2 | KBS2 | Overall |
| CH 8 | GS Home Shopping | GS Home Shopping | Drama/Home Shopping |
| CH 9 | KBS1 | KBS1 | Overall |
| CH 10 | Hyundai Home Shopping | Hyundai Home Shopping | Drama/Home Shopping |
| CH 11 | MBC | MBC | Overall |
| CH 12 | CJ Home Shopping | CJ Home Shopping | Drama/Home Shopping |
| CH 13 | TBC | TBC | Overall |
| CH 14 | Woori Home Shopping | Woori Home Shopping | Drama/Home Shopping |
| CH 15 | Nongsusan Home Shopping | Nongsusan Home Shopping | Drama/Home Shopping |
| CH 16 | MCN | Movie Channel | Movie/Music |
| CH 17 | KCS | Regional Channel | Overall |
| CH 18 | Done TV | Drama, Show, Entertainment | Overall |
| CH 19 | CEM TV | Culture Information Channel | Education/Others |
| CH 21 | CMC TV | Family Entertainment TV | Overall |
| CH 22 | OCN | Orion Cinema | Movie/Music |
| CH 23 | Human TV | Human TV | Overall |
| CH 24 | YTN | YTN | News/Economic |
| . | . | . | . |
| . | . | . | . |
| . | . | . | . |

TABLE 4

| Virtual Channel | Ensemble Label | Service Label | Using Frequency | Provider |
|---|---|---|---|---|
| CH 9 | 1. U-KBS | KBS-STAR | 12B | KBS |
|  | 2. U1 DMB | KBS HEART | 8A | U1 Media |
| CH 11 | 3. MBC DMB | myMBC | 12A | MBC |
| CH 13 | 4. SBS DMB | SBS u TV | 12C | SBS |
| CH 24 | 5. YTN DMB | mYTN | 8B | YTN |
|  | 6. U1 DMB | U1 | 8A | U1 Media |
|  | 7. 1to1 | 1to1-TV | 8C | Korea DMB |
| . | . | . | . | . |
| . | . | . | . | . |
| . | . | . | . | . |

As shown, Table 2 provides an example of a channel list according to the order of an using frequency provided in the DMB service, Table 3 provides an example of a channel list of sky wave broadcasting or cable broadcasting, and Table 4 provides an example of a channel list including virtual channels according to exemplary embodiments of the present invention.

As shown in Table 4, the channel list according to exemplary embodiments of the present invention, channel information of sky wave broadcasts or cable broadcasts are allocated as a virtual channel to broadcasting channels in which providers of broadcasting channels in the DMB channel list shown in the Table 2 are identical to those of broadcasting channels in the channel list of sky wave broadcasting or cable broadcasting shown in the Table 3.

Further, as shown in Table 4, a channel list constructed by allocating the virtual channel is aligned in a channel list order of KBS, MBC, SBS, and YTN as in a channel list of sky wave broadcasts or cable broadcasts, and DMB channels having no channel information of sky wave broadcasts or cable broadcasts are aligned in an existing frequency order.

Further, the channel list can be variously constructed by the user, For example, the order shown in the Table 4 may be variously aligned by the user, and the virtual channel may also be allocated to a channel number according to the user convenience.

Figure 4:
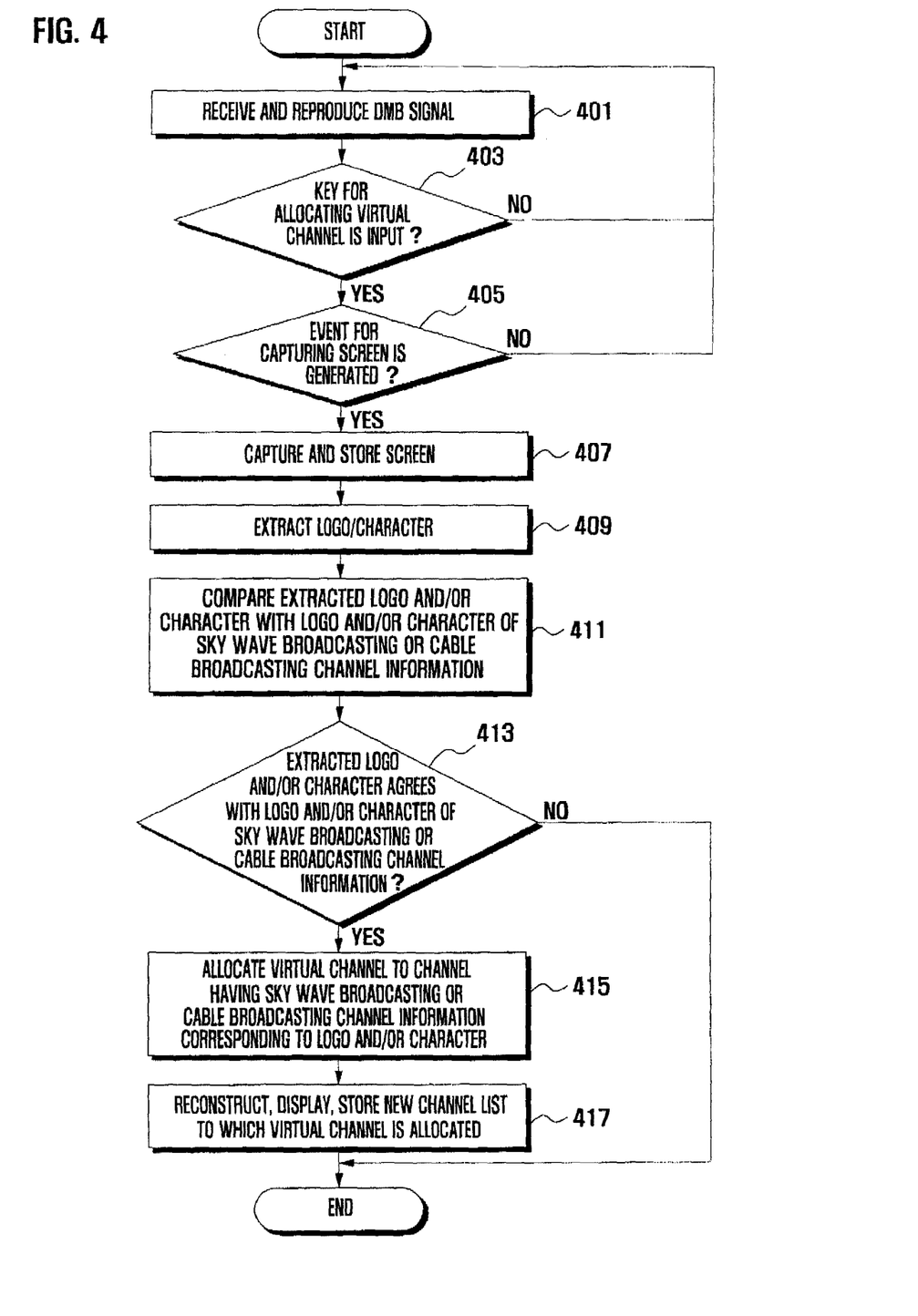
FIG. 4 is a flowchart illustrating a method of providing a channel list by a virtual channel in a mobile terminal according to an exemplary embodiment of the present invention.

FIG. 4 is a flowchart illustrating a method of providing a channel list by a virtual channel in a mobile terminal according to an exemplary embodiment of the present invention.

Referring to FIG. 4, the mobile terminal receives and reproduces a DMB signal transmitted from a predetermined broadcasting center by a user's request in Step 401.

Next, the mobile terminal determines whether a key for allocating a virtual channel is input by the user while reproducing the DMB signal in Step 403. If a key for allocating a virtual channel is input by the user while reproducing the DMB signal, a process continues at Step 405.

The mobile terminal determines whether an event for capturing a screen reproducing the DMB signal is generated in Step 405. If an event for capturing a screen reproducing the DMB signal is generated, the mobile terminal captures and stores a screen reproducing the DMB signal corresponding to the capturing event in Step 407.

The capturing event includes an instruction for capturing a screen of the reproducing DMB signal in the mobile terminal.

The capture event includes user request, for example, a capture event by the input of a function key (e.g. a function key of a camera unit) formed in a predetermined position of the mobile terminal. Further, the capture event includes a user setting, for example setting a capture event that automatically captures a screen including a specific character or logo when the specific character or logo is recognized in a reproduced DMB signal.

The mobile terminal extracts a specific logo and/or character included in data captured and stored at Step 407, for example, a logo and/or character of 'MBC/KBS/SBS/YTN' in Step 409 and the process continues at Step 411.

The mobile terminal compares the extracted logo and/or character with a logo and/or character of sky wave broadcast or cable broadcast channel information corresponding to the logo and/or character in Step 411.

Next, the mobile terminal determines whether the extracted logo and/or character agrees with the logo and/or character of sky wave broadcasting or cable broadcasting channel information in Step 413. If the extracted logo and/or character agrees with the logo and/or character of sky wave broadcasting or cable broadcasting channel information, the process continues at Step 415.

The mobile terminal allocates a virtual channel to a channel having the sky wave broadcasting or cable broadcasting channel information corresponding to the logo and/or character in Step 415. That is, the mobile terminal virtually maps the found channel number of sky wave broadcasts, or cable broadcasts as shown in Table 4, to a DMB channel of the reproduced DMB signal and allocates the virtual channel to the DMB channel of the reproduced DMB signal.

Thereafter, the mobile terminal reconstructs, displays, and stores a new channel list to which the virtual channel is allocated in Step 417.

Figure 5:
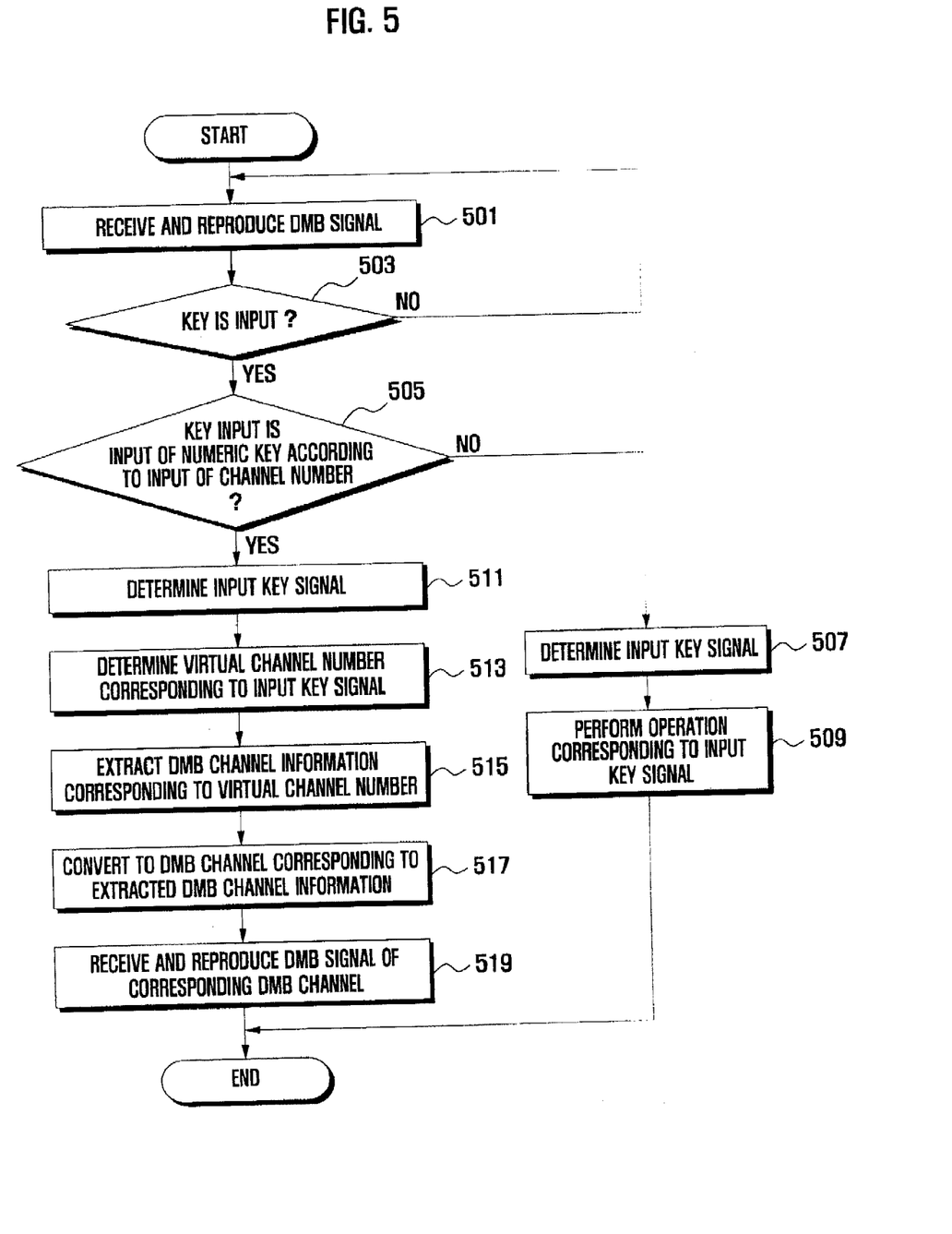
FIG. 5 is a flowchart illustrating a method of converting a DMB channel by inputting a virtual channel number in a mobile terminal according to an exemplary embodiment of the present invention.

FIG. 5 is a flowchart illustrating a method of converting a DMB channel by inputting a virtual channel number in a mobile terminal according to an exemplary embodiment of the present invention. Referring to FIG. 5, the mobile terminal receives and reproduces a DMB signal transmitted from a predetermined broadcasting center by a user's request in Step 501.

Next, the mobile terminal determines whether a predetermined key is input by a user while reproducing the DMB signal in Step 503. If a predetermined key is input by a user, the process continues at Step 505.

The mobile terminal determines whether the key input is key input for changing the DMB channel, i.e. the input of a numeric key according to the input of the channel number at Step 505.

If the key input is not the input of a numeric key, the mobile terminal determines an input key signal at Step 507 and the process continues at Step 509 and the mobile terminal performs an operation corresponding to the input key signal. For example, the mobile terminal performs an operation corresponding to user request such as termination of reception and reproduction of a DMB signal, storage of a reproduced DMB signal, and menu execution.

If the key input is the input of a numeric key, the mobile terminal determines the input key signal 511 and the process continues at Step 513. The mobile terminal determines a virtual channel number corresponding to the input key signal at Step 513.

Next, the mobile terminal extracts DMB channel information corresponding to the determined virtual channel number at Step 515. The mobile terminal then converts the DMB channel to a DMB channel corresponding to the extracted DMB channel information at Step 517.

The mobile terminal receives and reproduces a DMB signal of the corresponding DMB channel converted by conversion of the DMB channel at Step 519.

Figure 6:
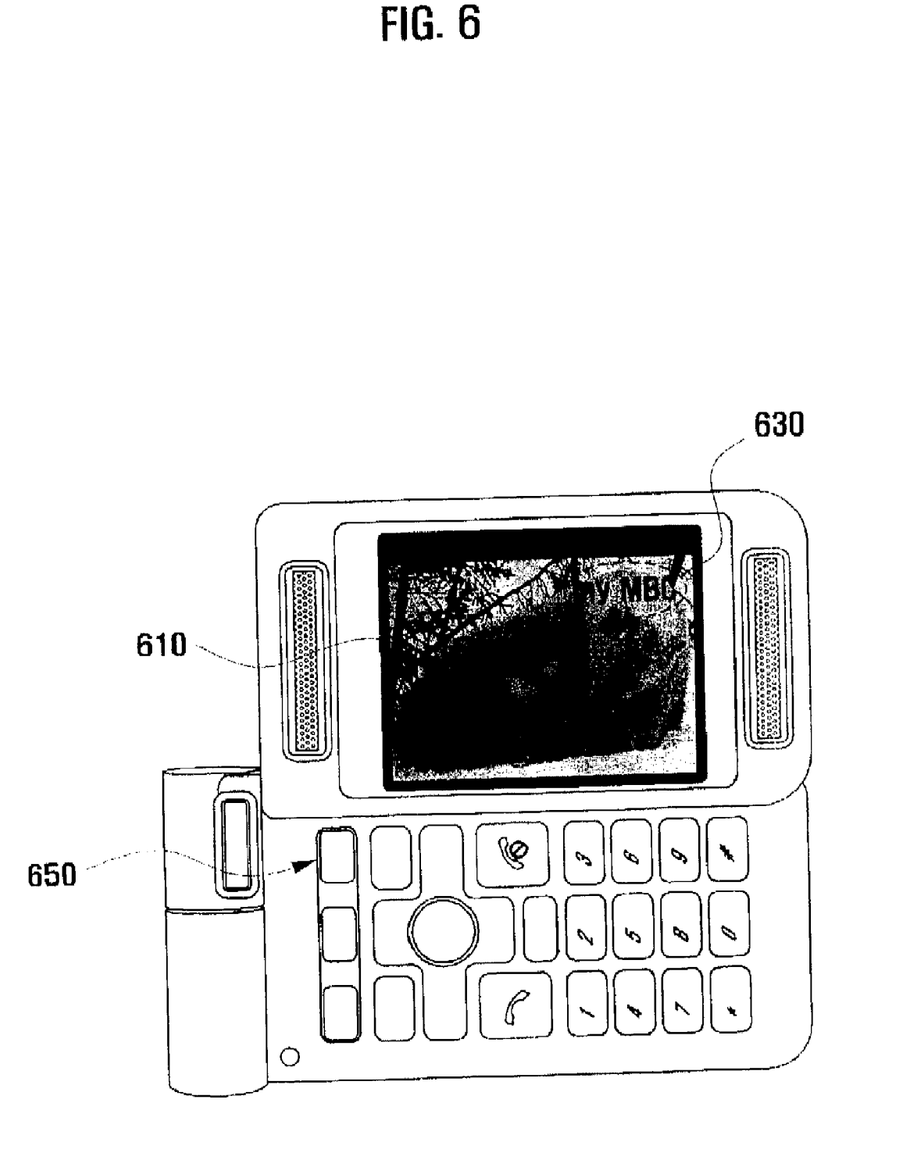
FIG. 6 illustrates an operation of capturing a screen of a reproducing DMB signal in a mobile terminal according to an exemplary embodiment of the present invention.

FIG. 6 illustrates operation of capturing a screen of a reproduced DMB signal in a mobile terminal according to an exemplary embodiment of the present invention. As shown in FIG. 6, reference numeral 610 indicates an example of a screen for receiving and reproducing a DMB signal transmitted from a predetermined broadcasting center, reference numeral 630 indicates a character/logo for displaying channel information of the reproducing DMB signal, and reference numeral 650 indicates a function key for capturing a reproduced screen, for example, a camera function key.

Referring to FIG. 6, when a previously registered logo/character indicated by the reference numeral 630 is recognized on a screen indicated by reference numeral 610 by a user's request, for example, the input of a function key or a user's setting method while receiving and reproducing the DMB signal, the mobile terminal captures the screen indicated by the reference numeral 610 including the logo/character of the reference numeral 630.

Next, the mobile terminal extracts 'MBC', which is sky wave broadcasting or cable broadcasting channel information, from the recognized logo/character, for example 'myMBC' as indicated by reference numeral 630, acquires channel information about the extracted 'MBC' from the storage unit, and virtually maps the acquired channel number of 'MBC' to a DMB channel while reproducing a DMB signal.

For example, assuming that a DMB channel number of the reproducing DMB signal indicated by the reference numeral 610 is '5', the DMB channel number '5' is mapped to '11', which is a sky wave broadcasting or cable broadcasting channel number of the 'MBC', and a vertical channel is allocated to the channel number '11'.

Figure 7:
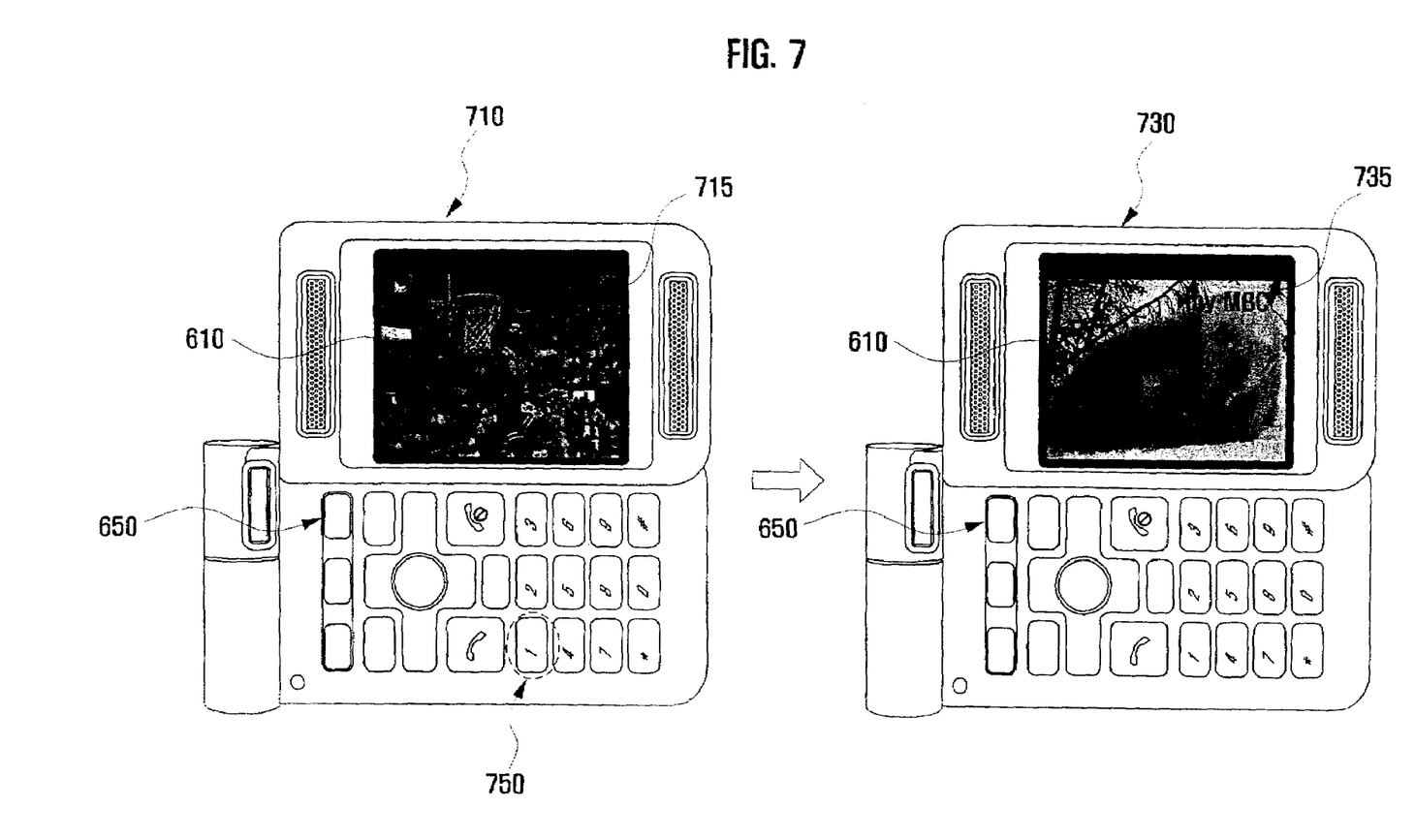
FIG. 7 illustrates an operation of converting a DMB channel by inputting a virtual channel number while reproducing a DMB signal in a mobile terminal according to an exemplary embodiment of the present invention.

FIG. 7 illustrates operation of converting a DMB channel by inputting a virtual channel number while reproducing a DMB signal in a mobile terminal according to an exemplary embodiment of the present invention. FIG. 7 shows an example of simply converting a channel by virtually mapping sky wave broadcasting or cable broadcasting channels that are familiar to a user to DMB channels, and inputting channel numbers of sky wave broadcasting or cable broadcasting to the mapped virtual DMB channels, as described with reference to FIG. 6.

Referring to FIG. 7, reference numeral 710 indicates a example of a screen reproducing a DMB signal corresponding to a predetermined DMB channel, for example, a 'KBS-STAR' channel indicated by reference numeral 715, reference numeral 730 indicates a example of a screen converting to a DMB channel by user request while reproducing a DMB signal corresponding to reference numeral 715, for example, a 'myMBC' channel indicated by reference numeral 735, and reproducing the corresponding DMB signal, and reference numeral 750 indicates an example of a hotkey for inputting to convert to a channel that the user is viewing.

As indicated by the reference numeral 710, the mobile terminal receives and reproduces a DMB signal corresponding to a DMB channel, for example, a 'KBS-STAR' channel requested by the user. While viewing the DMB signal, a key '1' of a keypad indicated by reference numeral 750 can be input two times to convert to channel '11', i.e. an 'MBC' channel of sky wave broadcasting or cable broadcasting familiar with the user.

The mobile terminal determines a key input signal by the user's key input, extracts DMB channel information mapped by the determined key input signal, and converts the DMB channel to the corresponding channel.

For example, as described above, when a predetermined DMB channel is mapped to virtual channel '11', the mobile terminal detects actual DMB channel information corresponding to the virtual channel number '11', i.e. the key input signal '11'. Thereafter, the mobile terminal converts the DMB channel to the detected DMB channel, for example, a DMB channel corresponding to 'myMBC' indicated by reference numeral 735 and receives and reproduces the DMB signal corresponding to the DMB channel.

As described above, according to an exemplary embodiment of the present invention, a channel list can be constructed by mapping a channel list generally provided in the DMB service to virtual channel information of sky wave broadcasting or cable broadcasting. Further, by mapping the DMB channel selected in the channel list to a sky wave broadcasting or cable broadcasting channel, a virtual channel is generated, and if information about the virtual channel is input, the channel can be immediately converted to the corresponding DMB channel.

As described above, according to an apparatus and method for providing a digital broadcasting channel list in a mobile terminal of the present invention, a list of digital broadcasting channel can be changed in a mobile terminal having a digital broadcasting function for user convenience.

Further, when the channel list of the digital broadcasting is changed, by allocating a virtual channel based on channel information of sky wave broadcasting or cable broadcasting familiar with the user to a DMB channel, user convenience in using digital broadcasting is improved.

Further, when the DMB channel is converted, the DMB channel can be simply converted by inputting a channel number corresponding to the virtual channel, so that fast access and conversion to the DMB channel can be performed and thus user convenience can be improved.

Although exemplary embodiments of the present invention have been described in detail hereinabove, it should be clearly understood that many variations and modifications of the basic inventive concepts herein taught that may appear to those skilled in the present art will still fall within the spirit and scope of the present invention, as defined in the appended claims.

What is claimed is:

1. A method of providing a channel list of digital broadcasting in a mobile terminal, the method comprising:
   receiving and reproducing digital broadcasting according to a user's request;
   determining whether an event for capturing a screen is generated while reproducing the digital broadcasting;
   capturing and storing, if the event for capturing a screen is generated, a screen of the reproduced digital broadcasting;
   extracting a specific logo included in the screen of the captured and stored digital broadcasting;
   searching for sky wave broadcasting channel information corresponding to the extracted logo;
   allocating a virtual channel to the reproduced digital broadcasting using found sky wave broadcasting channel information corresponding to the logo, and virtually mapping a channel number of sky wave broadcasting to the channel of the reproduced digital broadcasting; and
   completing setting of a channel list including information about the allocated virtual channel.

2. The method of claim 1, wherein the event includes an instruction for capturing a screen of the reproduced digital broadcasting.

3. The method of claim 1, wherein capturing a screen of the reproduced digital broadcasting comprises:
   at least one of capturing the screen by key input of the user; and automatically capturing, when a specific logo is recognized in the reproduced digital broadcasting, a screen including the specific logo.

4. The method of claim 1, wherein allocating the virtual channel to the reproduced digital broadcasting comprises:
   searching for information about a sky wave broadcasting channel corresponding to a channel of the reproducing digital broadcasting;
   acquiring the channel number to map to a channel of the reproducing digital broadcasting from the found information about the sky wave broadcasting channel; and
   allocating a virtual channel to the channel of the reproducing digital broadcasting.

5. The method of claim 1, further comprising aligning and displaying, if setting of a channel list including the virtual channel information is complete, a channel list changed by allocating the virtual channel in a channel order of sky wave broadcasting including the virtual channel.

6. A mobile terminal for providing a digital broadcasting service, the terminal comprising:
   a multimedia module for receiving and providing digital broadcast service and a channel list provided in a digital broadcasting service;

a key input unit for inputting information for mapping DMB channels in a channel list of the received digital broadcast to virtual channels according to user setting and key information for converting a digital broadcast channel;

a memory unit for storing programs for providing the digital broadcasting service and programs for providing a channel list to which sky wave broadcasting channel numbers are virtually mapped, and for storing data generated while performing the programs, sky wave broadcasting channel information and the channel list; and a controller for controlling extraction of a logo corresponding to a sky wave broadcasting channel from a screen of reproduced digital broadcasting and allocating a virtual channel to a channel of the reproduced digital broadcasting using the extracted logo.

7. The mobile terminal of claim 6, wherein the memory unit comprises:

a program for virtually mapping a digital broadcasting channel selected by the user to a channel number of sky wave broadcasting corresponding to user's input;

a program for extracting a logo corresponding to sky wave broadcasting channel information while reproducing digital broadcasting;

a program for allocating the extracted sky wave broadcasting channel number to a virtual channel of a channel of the reproduced digital broadcasting; and a program for converting, when a sky wave broadcasting channel number is input while reproducing digital broadcasting, to a digital broadcasting channel mapped to the channel number.

8. The mobile terminal of claim 6, wherein the controller controls, if a channel change signal is input through the key input unit while reproducing digital broadcasting, conversion and display of a digital broadcasting channel mapped to the input channel change signal.

9. The mobile terminal of claim 8, wherein the channel change signal includes a channel number of sky wave broadcasting virtually mapped to a digital broadcasting channel for conversion.

10. The mobile terminal of claim 6, wherein the controller searches for sky wave broadcasting channel information corresponding to a channel of the reproduced digital broadcasting, acquires a channel number to map to a channel of the reproduced digital broadcasting from found sky wave broadcasting channel information, and allocates a virtual channel to the channel of the reproducing digital broadcasting by virtually mapping the acquired sky wave broadcasting channel number to the channel of the reproducing digital broadcasting.

11. The mobile terminal of claim 6, wherein the controller controls screen capture including a logo corresponding to a predetermined event while reproducing the digital broadcast, extracts the logo included in the captured screen, searches for sky wave broadcasting channel information corresponding to the extracted logo, and allocates the found sky wave broadcasting channel information to a virtual channel of the digital broadcasting channel.

12. The mobile terminal of claim 11, wherein the predetermined event includes an instruction for capturing a screen of the reproduced digital broadcast.

13. The mobile terminal of claim 11, wherein capturing the screen corresponding to the event comprises:

at least one of capturing the screen by key input of the user and automatically capturing the screen by recognizing a specific logo from the reproduced digital broadcast.

* * * * *